(12) United States Patent
Keeper et al.

(10) Patent No.: US 8,602,052 B2
(45) Date of Patent: Dec. 10, 2013

(54) CLAMP RING FOR WELDED DIAPHRAGMS

(75) Inventors: Branden W. Keeper, Mentor, OH (US);
William H. Glime, III, Chagrin Falls, OH (US); Daniel E. Zeiler, Chardon, OH (US)

(73) Assignee: Swagelok Company, Solon, OH (US)

( * ) Notice: Subject to any disclaimer, the term of this patent is extended or adjusted under 35 U.S.C. 154(b) by 185 days.

(21) Appl. No.: 13/165,264

(22) Filed: Jun. 21, 2011

(65) Prior Publication Data

US 2011/0308655 A1 Dec. 22, 2011

Related U.S. Application Data

(60) Provisional application No. 61/357,207, filed on Jun. 22, 2010.

(51) Int. Cl.
*F16K 7/00* (2006.01)

(52) U.S. Cl.
USPC ............. 137/315.27; 137/315.05; 251/331; 92/98 R

(58) Field of Classification Search
USPC ............ 137/315.05, 315.27; 251/331, 335, 251/61.1, 61.2, 61.3, 61.4, 63.5, 65.63; 92/89, 98 R, 104 M
See application file for complete search history.

(56) References Cited

U.S. PATENT DOCUMENTS

| | | | |
|---|---|---|---|
| 2,679,856 A | 6/1954 | Gerritsen et al. | |
| 4,029,296 A | 6/1977 | Hartmann et al. | |
| 4,750,709 A * | 6/1988 | Kolenc et al. | 251/335.2 |
| 4,760,990 A | 8/1988 | Kerger et al. | |
| 5,201,492 A | 4/1993 | Beauvir | |
| 5,516,078 A | 5/1996 | Wellener, III et al. | |
| 6,508,453 B2 * | 1/2003 | Mamyo | 251/63.5 |
| 6,749,136 B1 | 6/2004 | Wilson et al. | |
| 7,000,889 B2 | 2/2006 | Kah, Jr. et al. | |
| 7,370,664 B2 | 5/2008 | Glime | |
| 7,377,483 B2 * | 5/2008 | Iwabuchi et al. | 251/331 |
| 2007/0257219 A1 * | 11/2007 | Perrin | 251/61.5 |
| 2009/0242818 A1 | 10/2009 | Leys et al. | |

OTHER PUBLICATIONS

International Search Report and Written Opinion from PCT/US11/41223 dated Nov. 9, 2011.

\* cited by examiner

*Primary Examiner* — John K Fristoe, Jr.
*Assistant Examiner* — Kevin Barss
(74) *Attorney, Agent, or Firm* — Calfee, Halter & Griswold LLP

(57) ABSTRACT

A diaphragm sealed flow cavity comprises a first body comprising a support surface, a diaphragm comprising an outer portion that is joined by a weld to the first body, a clamped portion, and an inner portion that is movable along an axis, with the clamped portion of the diaphragm being compressed between the bearing surface and the support surface. The diaphragm sealed flow cavity may include a cylindrical body having a crimped portion for joining the cylindrical body to the first body. The diaphragm sealed flow cavity may also include a member that applies a live load to the clamped portion of the diaphragm. In the exemplary embodiments, the diaphragm sealed flow cavity may be realized as part of a diaphragm flow control valve having a valve body, diaphragm and a housing.

24 Claims, 13 Drawing Sheets

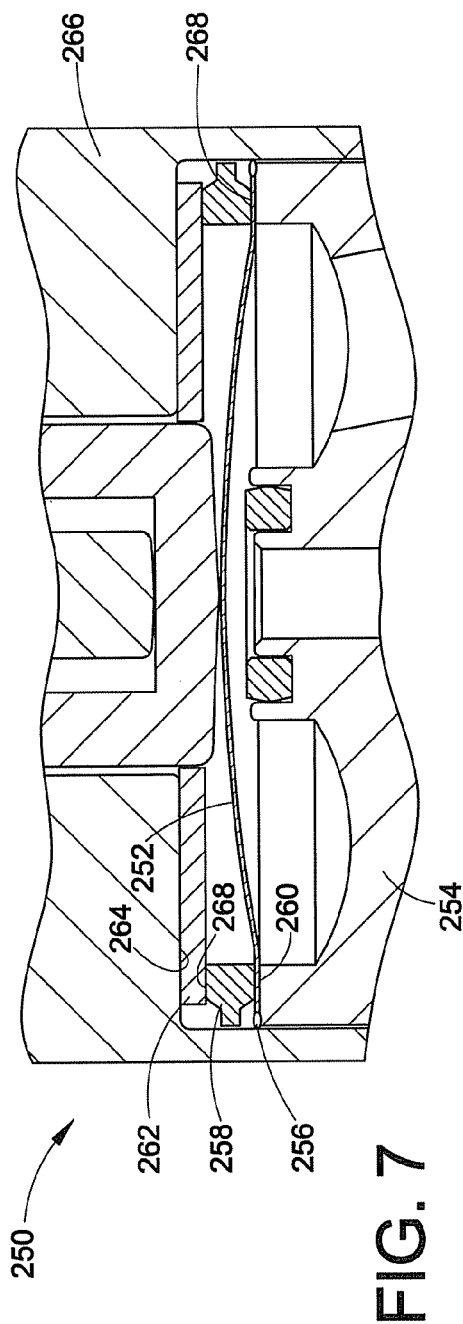
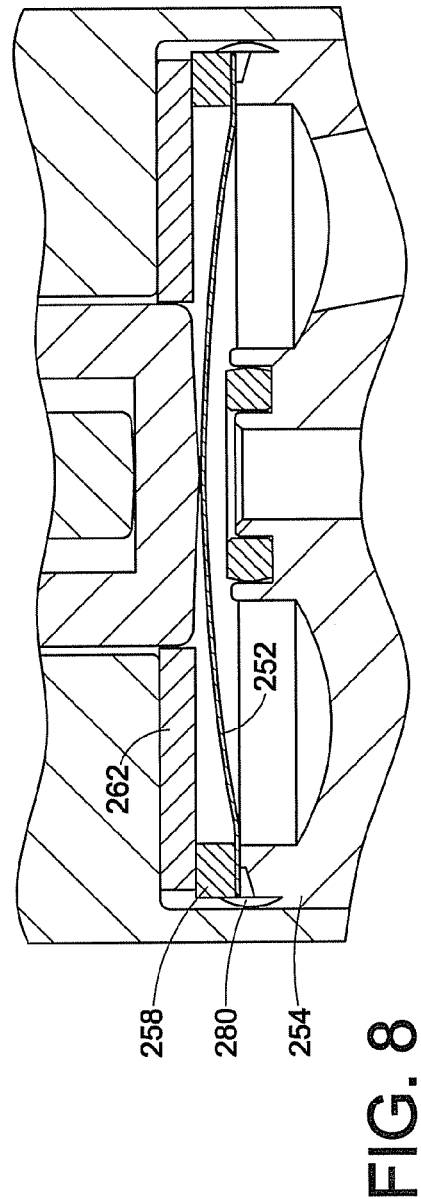
FIG. 7
FIG. 8

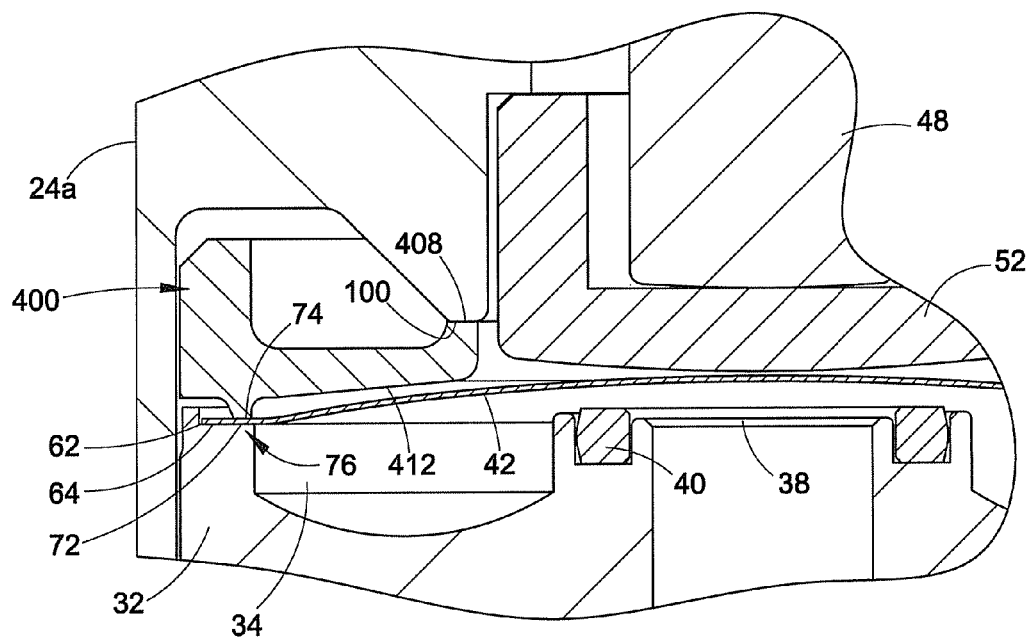
FIG. 13
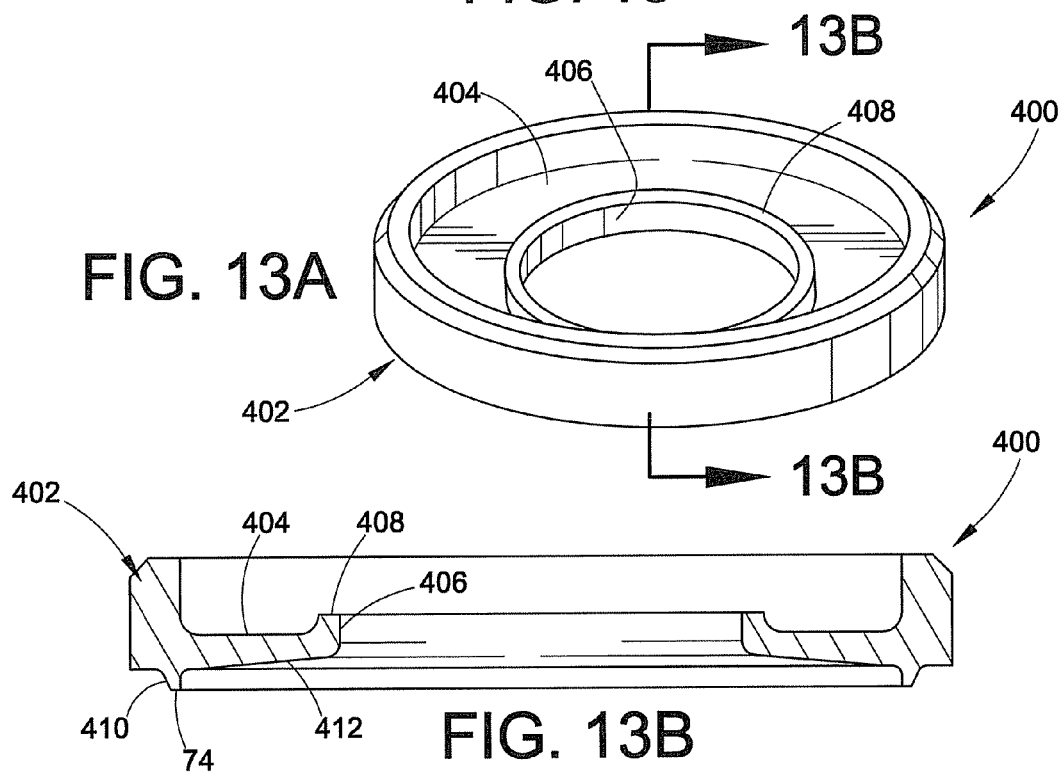
FIG. 13A
FIG. 13B

CLAMP RING FOR WELDED DIAPHRAGMS

RELATED APPLICATIONS

This application claims the benefit of pending U.S. provisional patent application Ser. No. 61/357,207 filed on Jun. 22, 2010, for CLAMP RING FOR WELDED DIAPHRAGMS, the entire disclosure of which is fully incorporated herein by reference.

TECHNICAL FIELD OF THE INVENTIONS

The present disclosure relates to diaphragm valves such as are commonly used, for example, to contain, regulate or otherwise control flow of liquid or gas fluids. More particularly, the disclosure relates to diaphragm valves of the type in which a portion of the diaphragm is welded to a support surface.

BACKGROUND

Diaphragm valves are known and are used in many diverse applications for fluid flow control, including gas and liquid fluids. In one form, a portion of the diaphragm may be welded to a support surface in order to provide a body seal that prevents loss of media to the environment.

SUMMARY OF THE DISCLOSURE

In accordance with an embodiment of one or more of the inventions presented in this disclosure, a member is provided in a welded diaphragm valve by which a compressive load is applied to a diaphragm near a region where the diaphragm is welded to a support structure. This compressive load functions to isolate the weld from bending stresses and moments when the diaphragm is flexed or moved during valve actuation. In one embodiment, the compressive load is a spring load or live load produced by an elastic deformation of the member to store potential energy that sustains an applied load on the diaphragm. In one embodiment, the member comprises a clamp ring that is loaded by action of a housing member. The housing member in one embodiment may comprise a housing for an actuator used with the diaphragm valve. Others of the inventions include, separately or in various combinations: the clamp ring geometry or shape; the combination of a diaphragm valve, actuator and clamp member; and a method for manufacturing a diaphragm valve. Different exemplary embodiments of the clamp ring or member are disclosed herein, including integral and non-integral designs. Optional embodiments may include a crimped housing, a knurled region between a crimped housing and valve body, and a visually perceptible base design that indicates angular orientation of the valve body during installation. An optional mounting bolt retention feature is also provided, such as may be used, for example, with modular systems of the type that have surface mount fluid components that can be disposed on a substrate or other support surface.

BRIEF DESCRIPTION OF THE DRAWINGS

FIG. 6A illustrates an optional anti-rotation feature for the assembly of FIG. 1;

FIG. 7 illustrates an alternative embodiment of a clamp ring;

FIG. 8 illustrates another alternative embodiment of a clamp ring;

FIG. 13 is an enlarged view of the clamp ring area of the assembly of FIG. 12;

FIG. 13A is a perspective illustration of the clamp ring embodiment used in FIG. 12;

FIG. 13B is an elevation in cross-section of the clamp ring embodiment of FIG. 13A taken along the line 13B-13B in FIG. 13A;

DESCRIPTION OF THE EXEMPLARY EMBODIMENTS

Figure 1:
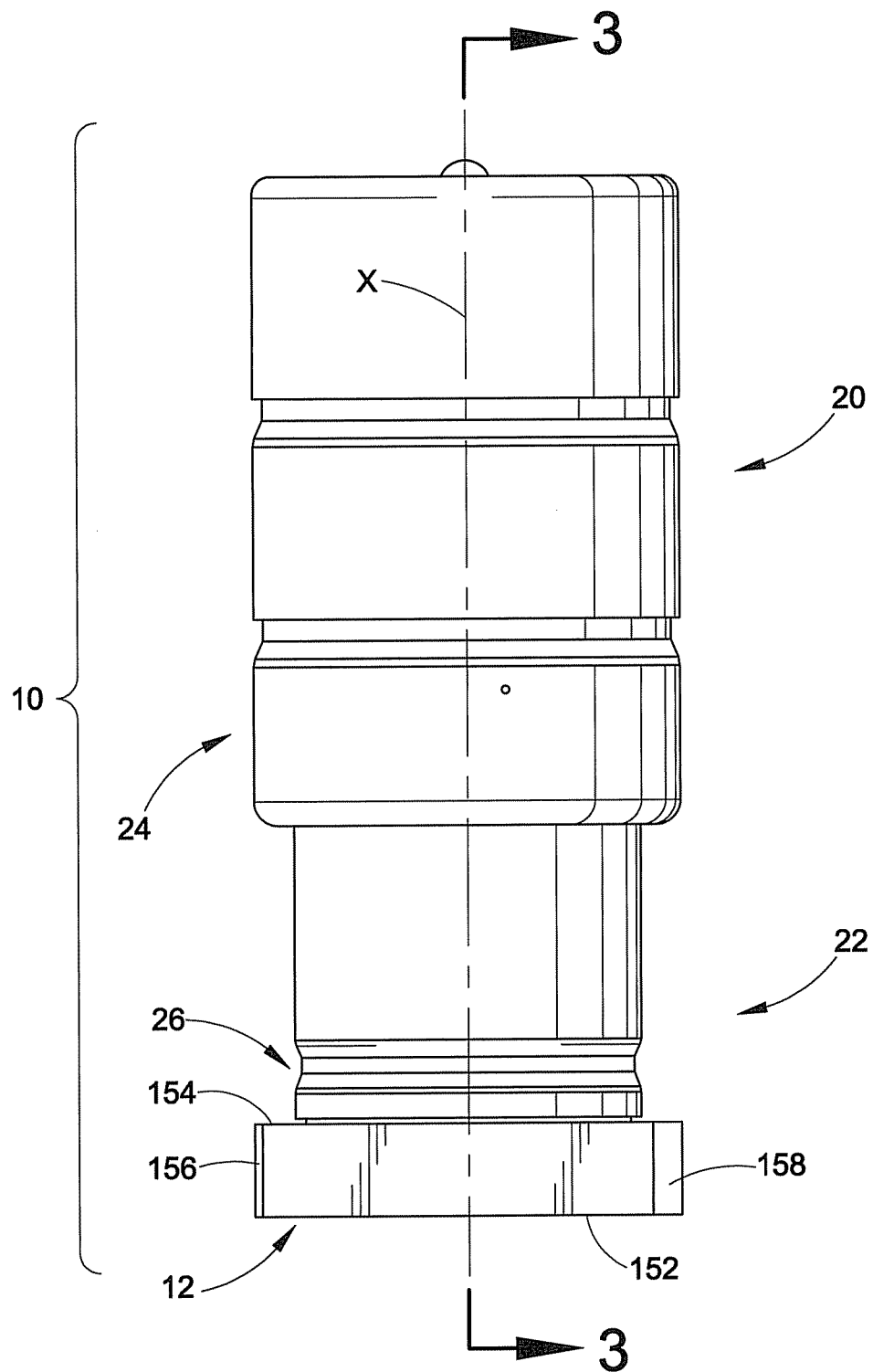
FIG. 1 is an embodiment of a diaphragm valve and automatic actuator assembly in elevation.

Although the exemplary embodiments herein are presented in the context of a welded diaphragm valve that is manually or pneumatically actuated, such is not required. Other actuation techniques including but not limited to solenoid and hydraulic actuation may be used. Also, the exemplary embodiments herein illustrate an integrated valve and actuator assembly wherein the valve body may be used, for example, with surface mounted manifold systems. But the inventions may be used with valves that do not have an actuator fully assembled therewith, and may be used with valves that are used in applications other than surface mounted manifold systems. The inventions herein are directed to various techniques for increasing the cycle life for welded diaphragm valves, for example, for high pressure or high actuation rate or high rated cycle applications, but the inventions may be used for valves that operate in less severe environments.

Moreover, the inventions are not limited to specific examples herein of the valve body design, porting, diaphragm design or actuator design, but rather the inventions may be used with many different types of welded diaphragm valves and actuators, and may also be used with other welded diaphragm devices such as regulators. Therefore, the inventions herein are broadly applicable to devices that use a diaphragm to seal a flow cavity. The exemplary embodiments herein also illustrate use of stainless steel diaphragms and assembly components, however, other suitable materials may be used as needed for a particular application. The inventions may be used with single diaphragms or multiple stacked diaphragms.

As used herein we refer to an automatic actuator to mean any actuator that does not use a manually actuated handle or other device that is manually operable or coupled to or engaging the diaphragm to open and close a valve. A manual valve refers to an actuator that uses a handle or other device that is manually turned or actuated by an operator.

Also as used herein, the terms "live load" and "spring load" and derivative forms of those terms refer to an elastic deformation of a body by which potential energy is stored in at least a portion of the body so as to maintain a load applying force with another body. A live load, for example, may be realized with a flexible or resilient member that acts in a spring-like manner to store potential energy as the result of an elastic deformation of the member so as to maintain or sustain an applied load against another component. Such a member may in practice be a spring, such as a Bellville spring, or function similar to a Bellville or other spring, but such is not required. Other suitable structure may be used for the member to produce a live load effect whether such alternative structure would be considered or classified as a spring. Although the elastic deformation is used for providing the live load, there may or may not also be an accompanying plastic deformation, meaning that the member need not exhibit just an elastic deformation. A live load in the present disclosure is used to sustain a minimum load that compresses a portion of a diaphragm so as to maintain an isolation effect between a weld and flexure of the diaphragm as will be further described below. The use of a live load contributes to maintaining the desired compression of the diaphragm should there be a relaxation or slight separation of the compressing surfaces due to normal operation of the diaphragm device, temperature, pressure, vibration and so on.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
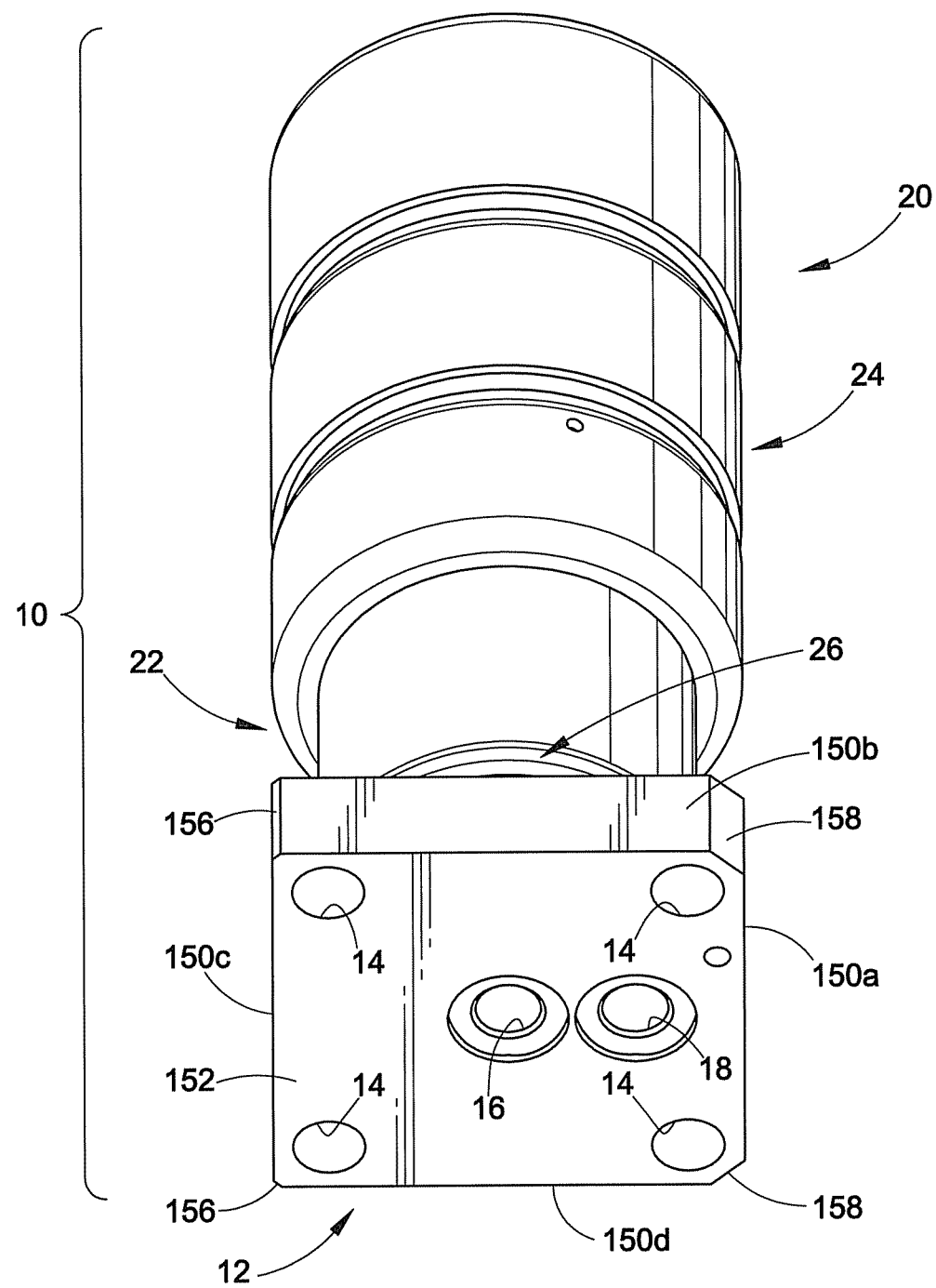
FIG. 2 is the assembly of FIG. 1 slightly rotated out of the plane of the drawing to illustrate a base configuration.

With reference to FIGS. 1 and 2, a first embodiment of one or more of the inventions is presented in an automatic air actuated diaphragm flow control valve assembly 10. For convenience, all references herein to "radial" and "axial" are referenced to the central longitudinal X axis and the radial axis Y except as may otherwise be noted. Also, all references herein to angles are referenced to the X axis except as may otherwise be noted.

The valve assembly 10 includes a base 12 that may be used to mount the assembly to a support structure. For example, the valve assembly 10 may be in the form of a surface mounted unit that can be installed on a modular platform such as a surface of a substrate or manifold for a gas stick (not shown). The base 12 may be integrally formed with the valve body (FIG. 3) or separately joined thereto as needed. As such, the base 12 may include mounting holes 14 that accept bolts use to secure the base 12 to the support structure, as well as coplanar fluid ports 16, 18 that may serve as inlet and outlet ports for fluid flow through the valve assembly 10 as is well known. However, this exemplary application is but one of many, and the inventions herein are not limited to any particular application, use or installation design of the valve or the actuator or the porting arrangement.

The actuator and valve assembly 10 includes an actuator portion 20 and a valve portion 22, with the actuator portion 20 stacked on top of the valve portion 22. A multi-piece cylindrical actuator housing 24 may be joined to the valve portion 22 by a crimped portion 26 of the housing, however, other techniques may be used to join the actuator portion 20 to the valve portion 22. Moreover, the housing 24 need not be multi-piece in all cases, or may have more or fewer sections as needed.

Figure 3:
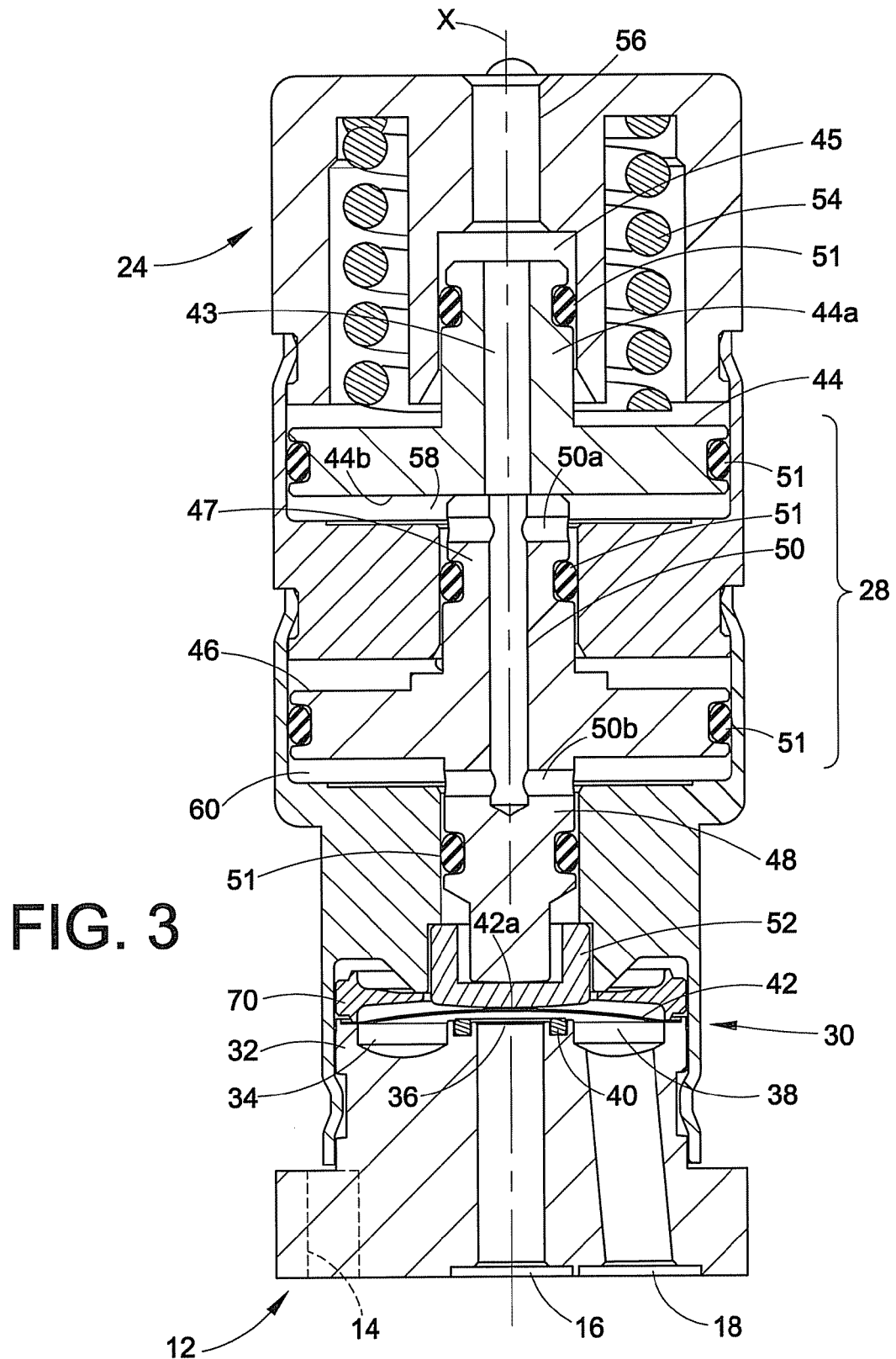
FIG. 3 is a longitudinal cross-section of the assembly of FIG. 1 with the valve shown in an open position.

With reference to FIG. 3, many different types of actuators and actuator designs may be used as needed, including those known or later developed. In this example, a double piston air actuator 28 may be used, although single piston actuators may be used or more than two pistons may be used. The air actuator 28 is used to open and close a valve 30. The valve 30 may be realized in the form of a welded diaphragm valve having a valve body 32 in which is formed a flow cavity 34 (in this embodiment being a flow control valve cavity) with first and second ports 36, 38 that communicate respectively with the inlet and outlet ports 16, 18 respectively (which port 16, 18 is the inlet and which is the outlet is a matter of design choice). An annular valve seat 40 surrounds the first port 36. The valve seat 40 may optionally be a symmetrical seat so that the seat may be installed into the valve seat recess 41 (see FIG. 4A) in either of two orientations to prevent the valve seat 40 from being installed upside down. An all metal valve seat may alternatively be used, either as an integral or non-integral valve seat. In this embodiment, the valve seat 40 may comprise a plastic such as PFA, Teflon™, or other suitable material that is compatible with the process fluid or media that will flow through the valve 30.

A disk-shaped diaphragm 42 overlays and seals the flow cavity 34 and includes a radially inner portion 42a that is deflected in a generally axial direction towards and away from the valve seat 40. When the diaphragm 42 is in a first position in which the inner portion 42a is pressed into contact with the valve seat 40 by the actuator 28, the valve 30 is closed, and when the diaphragm 42 moves to a second position in which the inner portion 42a is spaced from the valve seat 40, the valve is open.

Movement of the diaphragm 42 between its first and second positions is controlled by the actuator 28. The actuator 28 may include a first or upper piston 44 and a second or lower piston 46. The upper piston 44 may include a stem portion 44a and a first air passage 43 that extends axially through the first piston 44 and is in fluid communication with an air chamber 45. The second piston 46 may include a first stem portion 47 that is in operable contact or connection with a lower surface 44b of the upper piston 44. The second piston 46 may further include a second stem portion 48, also referred to herein as an actuator stem 48. The second piston 46 includes a second air passage 50 therethrough that is in fluid communication with the first air passage 43. The second air passage 50 may also include first and second cross-bores 50a, 50b which provide pressurized air to piston chambers 58, 60 respectively. Appropriate seals 51 such as o-rings for example, may be used to control the pressurized air inside the actuator 28.

The actuator stem 48 engages an optional drive button 52 that makes contact with an upper surface of the diaphragm 42, particularly in the inner portion 42a of the diaphragm. An optional spring 54 may be used to bias the pistons 44, 46 downward (as viewed in the drawings) so as to provide a normally closed valve 30. A normally open valve configuration may alternatively be used as needed. When the pistons 44, 46 are pushed downward by the action of the spring 54, the button 52 presses down against the diaphragm 42 to force the diaphragm to its first or valve closed position (not shown). In this first position, the first and second ports 36, 38 are not in fluid communication with each other. In order to open the valve 30, pressurized air is introduced into the air chamber 45 such as through an air fitting connection port 56. Pressurized air enters the piston chambers 58, 60 and forces the pistons upward against the force of the spring 54. This movement of the pistons axially retracts the button 52 and the diaphragm 42 is able to move to its second or valve open position, which is the position illustrated in FIG. 3. In this second position the first and second ports 36, 38 are in fluid communication with each other. In lieu of the spring 54, the actuator 28 may be designed as a double acting actuator (not shown) in which air pressure is used to both open and close the valve 30, as is well known in the art.

The diaphragm 42 may have many different shapes and configurations but will generally have an outer perimeter that overlays and typically extends radially past the outer perimeter of the valve cavity 34. In the exemplary embodiments, the diaphragm 42 may be a domed diaphragm such that the inner portion 42a has a curvature so that the diaphragm 42 is concave on the fluid or wet side that faces the valve seat 40. This curvature gives the diaphragm 42 a natural resilient bias outward and away from the valve seat 40, so that when the pistons 44, 46 are axially retracted, the diaphragm 42 can pop or snap or otherwise move into its second or valve open position. Also, fluid pressure in the valve cavity 34 will tend to force the diaphragm 42 toward the valve open position when the pistons 44, 46 have been axially retracted. However, other diaphragm designs may be used including tied diaphragms in which the central portion of the diaphragm is joined to the actuator stem 48. Thus far herein, the description of the actuator 28 and valve 30 design and operation are well known and a matter of design choice.

Figure 4:
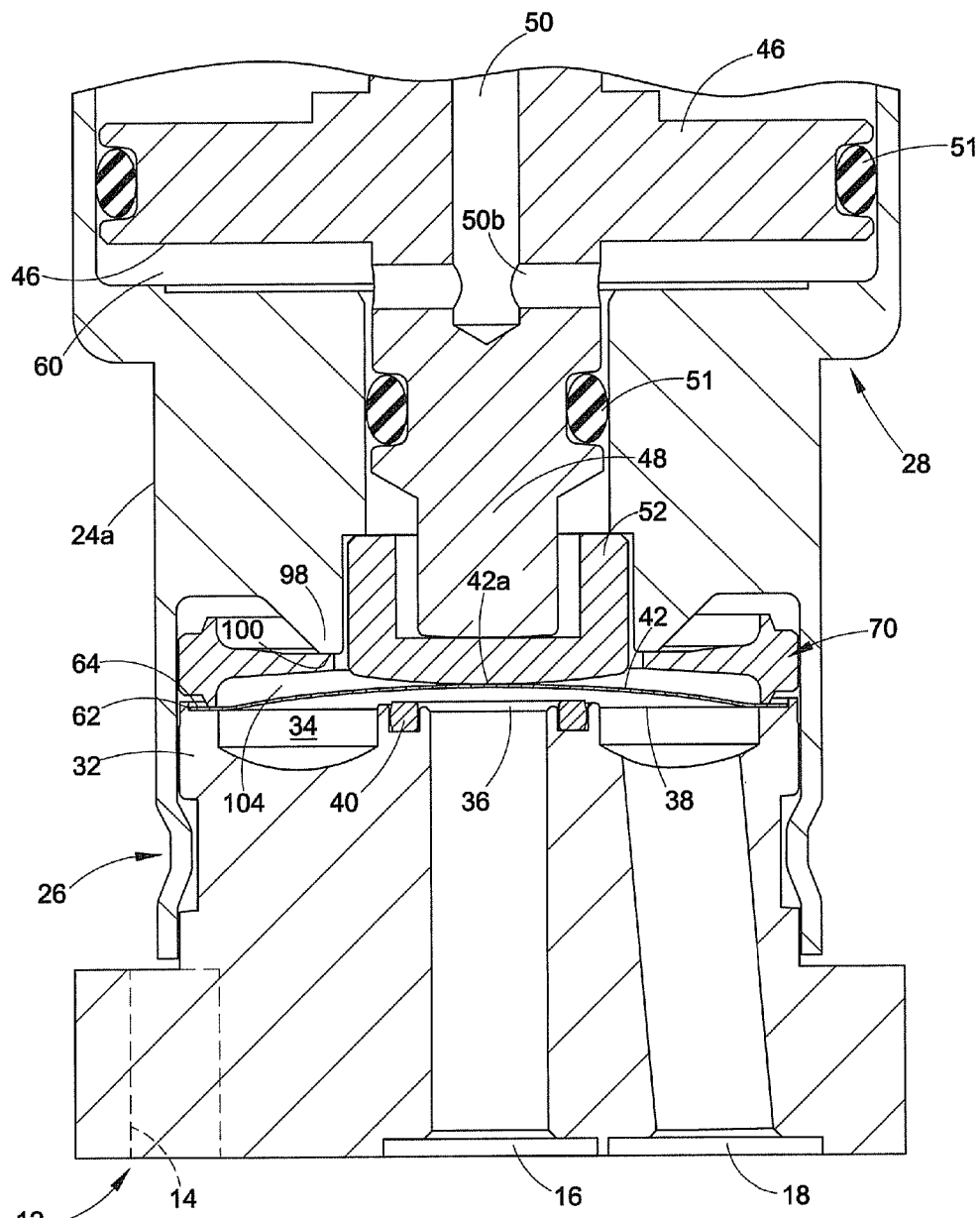
FIG. 4 is an enlarged view of a clamp ring portion of the assembly of FIG. 3.
Figure 4A:
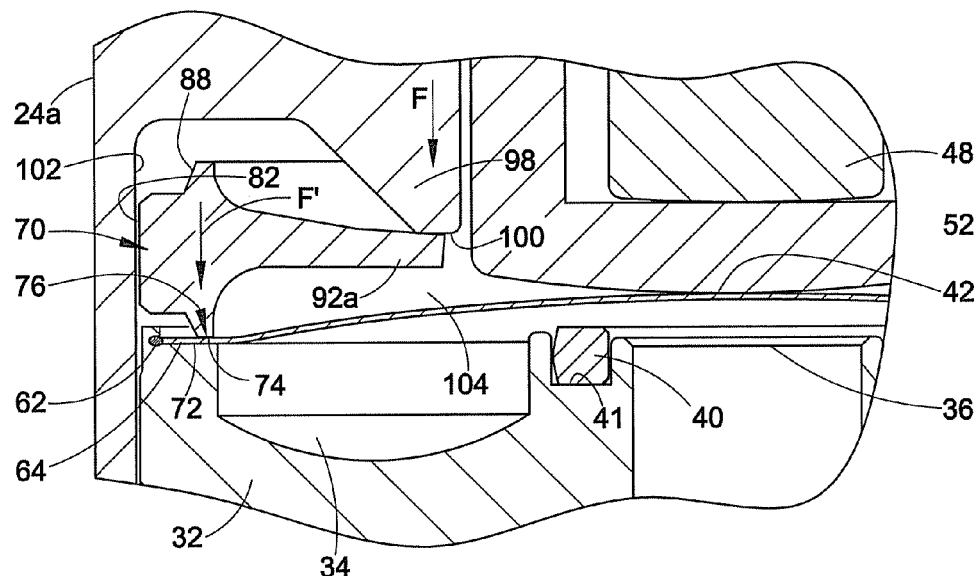
FIG. 4A is an enlarged view of the clamped diaphragm area of FIG. 4.

With reference next to FIGS. 4 and 4A, we illustrate in greater detail some of the inventive aspects of the present disclosure. The diaphragm 42 at its radially outer peripheral portion or peripheral edge is joined to the valve body 32 by a weld 62. The weld 62 may be formed by any suitable technique including but not limited to electric arc, laser welding, TIG and electron welding to name a few examples. This weld 62 ensures a fluid tight joint or seal between the diaphragm 42 and the valve body 32 so that fluid flow in the valve cavity 34 is restricted to between the first and second ports 36, 38 and also that process fluid does not enter into the actuator 28 or escape to the outside environment. The weld site includes the actual weld 62 and a heat affected zone 64 of the diaphragm that may exhibit strength changes as compared to the non-welded and non-heat affected portions of the diaphragm. The size and nature of the heat affected zone will depend in part of the material of the diaphragm and the welding parameters used.

During valve actuation or operating cycles between valve open and closed positions, the diaphragm 42 flexes substantially and may be exposed to high fluid pressures in the open position as well as to high cycle numbers or cycle rates. The flexing diaphragm will tend to exert bending moments and stress at the weld 62 and also at the heat affected zone 64 of the diaphragm. But with the concepts disclosed herein, we have been able to achieve millions of cycles at rated pressures of about 145 psi or more and burst pressures of about 4500 psi or more. The inventions herein, however, may be used with valves that are not exposed to such high fluid pressure or high cycle life.

With reference to FIGS. 4 and 4A, we provide a member or body 70 which we refer to herein as a clamp ring to describe its function of a body that is used to apply a compressive load between the diaphragm 42 and the valve body 32 so as to isolate the weld 62 and optionally part or all of the heat affected zone 64 from the bending stresses and moments of the diaphragm 42. The valve body 32 is provided with a support surface 72 which may be a planar annular shoulder or end face of the outer periphery of the valve body 32. The clamp ring 70 includes a bearing surface 74 (also see FIG. 4C) positioned so as to apply a compressive load between a clamped portion 76 of the diaphragm 42 and the valve body support surface 72. This compressive load compresses the diaphragm 42 against the support surface 72 at a location that is between the weld 62 and the inner portion 42a of the diaphragm, and preferably is radially inward and spaced from the weld 62 and also preferably radially inward and spaced from the heat affected zone 64. It may be in some designs that the clamped portion 76 will include a portion of the heat affected zone 64 of the diaphragm 42.

Figure 4B:
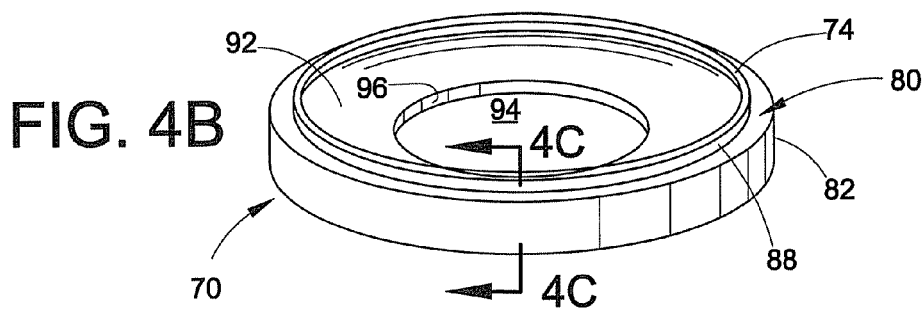
FIG. 4B is a perspective of a clamp ring embodiment.
Figure 4C:
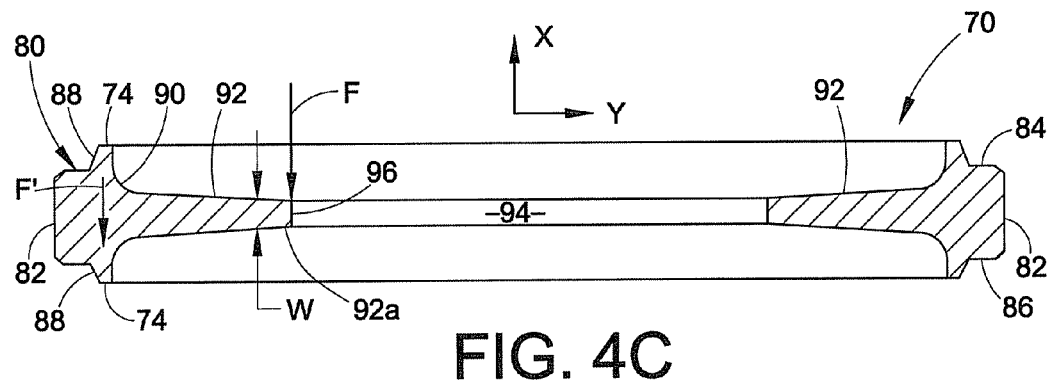
FIG. 4C is a longitudinal cross-section of the clamp ring of FIG. 4B.

With reference also to FIGS. 4B and 4C, this embodiment of a clamp ring 70 includes a generally annular radially outer body 80 with a circular outer wall 82. The circular outer wall 82 extends between first and second radially extending walls 84 and 86. Each radially extending wall 84, 86 blends to an axially and radially projecting rib 88. Each rib 88 extends to a bearing surface 74.

From each bearing surface 74, a concavely curved portion 90 blends to a generally radially extending inner ring or disk 92. The inner ring 92 extends to a central opening 94 at a radially inner edge 96. From each bearing surface 74, a concavely curved portion 90 blends to a generally radially extending inner ring or disk 92. The inner ring 92 extends to a central opening 94 at a radially inner edge 96. With additional reference to FIG. 4, it will be noted that the optional drive button 52 is appropriately sized to partially extend through the central opening 94 in the clamp ring 70. This allows the drive button 52 to engage the diaphragm central portion 42a. In the exemplary embodiment, the outer diameter of the drive button 52 is slightly less than the diameter of the central opening 94. Alternatively, the inner edge 96 of the central opening may be used to retain the drive button 52 during handling. For example, the clamp ring 70 may retain the drive button 52 so that it does not drop out during subsequent assembly and handling of the actuator prior to assembly on the valve body 32. For example, the drive button 52 may include a flange (not shown) on its outside diameter that engages the inside diameter of the clamp ring.

As viewed in the cross-section of FIG. 4C, the inner ring 92 may optionally symmetrically taper on both sides inwardly from the curved portion 90 and forms a somewhat cantilevered extension from the outer body 80. The inner ring 92 taper thus provides an inner portion 92a that has a reduced width W as compared to the width of the inner ring 92 closer to the ribs 88. This reduced width W provides a flexibility or elastic resilience to the inner ring 92 so that a load applied to or near the inner portion 92a will cause the clamp ring 70 to flex and elastically deform, particularly the inner ring 92.

As noted above, the actuator housing 24 may be a multipiece housing, although alternatively may be a single piece housing. In any case, the actuator housing 24 includes a lower housing portion 24a that may be crimped to the valve body 32 as at crimp 26 (FIG. 4). One of the inventive aspects of this disclosure are the advantages derived from the use of a welded diaphragm. Diaphragm based flow control devices, such as diaphragm valves for example, typically clamp down hard on the diaphragm periphery between the valve body and another member such as a housing or bonnet. The housing may or may not also serve as the housing for an actuator. In any case, this clamping action is done in order to assure a fluid-tight body seal about the outer peripheral portion of the diaphragm to seal the valve cavity. But the clamping is done with a static load, meaning that the housing/bonnet and the valve body typically are bolted together and tightened down in order to apply a high compressive load on the diaphragm to form the body seal. The use of bolts or screw or clamps to join a bonnet or housing to a valve body can result in larger radial dimensions than desired. For example, assemblies such as the exemplary assembly for surface mounted systems herein, the radial envelopes or footprint of the device can be quite constrained. As a consequence, bolted assemblies that must fit within this envelope or footprint can result in smaller diameter diaphragms which can reduce overall flow rates.

We have discovered that by using a welded diaphragm and the optional crimped housing technique, we can provide a larger diameter diaphragm in a given size (footprint) device. This can be used to provide higher flow, for example. But we have also determined that with the welded design used in high speed actuation and high cycle applications, the designer may want to isolate the weld from the bending stresses of the diaphragm. Therefore, the clamp ring may be used to provide this isolation of the weld site from the bending stresses, with the clamp ring still fitting within the desired footprint. The live load aspect may be used with a welded diaphragm regardless of the optional use of a crimped housing. When the optional crimping technique is used, it is preferred that the clamp ring produce an active load against the diaphragm so as to maintain a body seal. This is because the crimp design may in some cases be susceptible to environmental effects and vibrations which could cause a loss in static load compression. Therefore, in the exemplary embodiment, the welded diaphragm, optional live load and optional crimped assembly work together to provide a diaphragm flow control device that can have higher flow, less susceptibility to environmental effects and significantly higher operating cycles, even into the millions of cycles without diaphragm failure.

The lower housing 24a is provided with an axially extending annular member or protrusion 98 in the nature of a downwardly projecting flange (as viewed in the orientation of FIG. 4A). This protrusion 98 presents a load applying surface 100 that faces and contacts the inner ring 92 of the clamp ring 70 when the lower housing 24a is joined to the valve body 32. More particularly in this example the load applying surface 100 engages the inner ring 92 near or at the inner portion 92a or other suitable position as needed. The protrusion 98 may be sized so that when the lower housing 24a is joined to the valve body 32, the protrusion 98 pushes downward against the inner ring 92 and deflects or elastically deforms the inner ring 92 downward due to the applied load from the lower cylinder 24a as represented by the arrow F as viewed in FIG. 4C.

With reference again to FIG. 4A, the outer circumferential surface 82 of the clamp ring 70 may be closely received within the interior cylindrical wall 102 of the lower housing 24a. By having a small gap or close fit between the outer wall 82 of the clamp ring 70 and the interior cylindrical wall 102 of the actuator housing 24a, the clamp ring 70 may be concentrically centered within the assembly 10 and also may be supported by the interior cylindrical wall 102 when the protrusion 98 deflects the inner ring 92. This causes a clamping force to be applied through the bearing surface 74 to clamp the diaphragm 42 between the bearing surface 74 and the valve body support surface 72. In this manner, the load force of the lower housing 24a against the inner ring 92 is translated into a compressive live load or live loaded clamping force between the bearing surface 74 and the support surface 72 to clamp and compress the outer clamped portion 74 of the diaphragm between the weld site (which may include the weld 62 and part or all of the heat affected zone 64) and the inner portion 42a of the diaphragm. The load applying member in the form of the protrusion 98 thus applies a load against the inner ring 92 that is radially inward of the location of the clamping force applied to the diaphragm 42. The clamping force that supports the diaphragm 42 helps isolate the weld 62 and a portion or all of the heat affected zone 64 of the diaphragm from bending moments and stress during movement of the diaphragm 42 as the valve is open and closed. The clamped portion 74 also isolates stress and bending moments from affecting the weld 62 and a portion or all of the heat affected zone 64 when the valve 30 is in the open position under high pressure. Although not shown, a support member or backing member may be provided on the non-wetted side of the diaphragm 42 in the gap 104 to support the diaphragm in the open position under pressure.

The live loading produced by the clamp ring 70 may be used to compensate for changes in the various parts of the valve and actuator that could reduce the clamping force between the diaphragm 42 and the valve body 32. For example, the valve body 32 may comprises stainless steel whereas the actuator housing 24 may comprise aluminum. These materials expand and contract at different rates due to different coefficients of thermal expansion. When the assembly 10 is exposed to thermal changes, the compressive load between the housing 24 and the valve body 32 may lessen, which could reduce the clamping force applied to the diaphragm 42 in the clamped portion 74. By providing a liveloaded elastic deformation of the clamp ring 70, the clamping force on the diaphragm 42 may be maintained above a minimum designed value even though there may be dimensional changes in the various components that are part of the assembly 10 during thermal variations that cause a reduction in the clamping force.

Note that in comparing FIG. 4A with FIG. 4C, in the latter the clamp ring 70 is in its free, unstressed state, whereas in the former the clamp ring 70 is shown installed and in its stressed state. Thus, the inner ring 92 in FIG. 4A has been elastically deflected somewhat (downwardly as viewed in FIG. 4A) due to the forces F applied to the inner ring 92 through the protrusion 98. This elastic deformation or deflection acts in the nature of a spring to store potential energy that is used to sustain a compressive load on the diaphragm at the clamped portion 74. The forces F applied to the cantilevered inner ring 92 result in or translate to high forces F' that apply a high compressive live load to the diaphragm through the bearing surface 74.

The geometry of the clamp ring 70 facilitates the clamping action on the diaphragm, however, clamp rings with different shapes and geometries may be used. To name a few alternative examples available, the outer wall 82 need not be cylindrical but may have contours or other shapes such as a convex shape. The first and second radially extending walls 84, 86 need not lie on a radius but may taper in an axial direction. The ribs 88 may have a different profile and shape as well as the bearing surface 74. The inner ring 92 need not necessarily be tapered if sufficient flexibility is otherwise available.

From FIG. 4C it is to be noted that the clamp ring 70 is preferably, although not necessarily, symmetric about the X and Y axes. This allows the clamp ring 70 to be installed in either of two orientations along the X axis.

Although the protrusion 98 is illustrated as being integral with the lower housing 24a, it may also be provided by a separate part installed in the assembly.

With reference to FIGS. 1 and 2 we illustrate another optional feature. The base 12 may typically include four sides 150a-d and a flat lower surface 152 and flat upper surface 154. Corners at intersecting sides may be selectively chamfered or otherwise visually marked so that an assembler can mount the valve body onto a surface in the correct angular orientation. For example, chamfered corners 156 may have a visually smaller chamfer length than chamfered corners 158. The smaller chamfered corners 156 may be the two corners that are closest to one of the ports 16, 18, for example the port 16 when used as an inlet, while the larger chamfer corners 158 may be closest to the other port 16, 18, for example the port 18 when used as an outlet. In this manner the assembler will know the correct angular alignment of the base 12 without having to view the ports 16, 18 which also allows for post-assembly verification that the base 12 is properly oriented. The visually perceptible corners may be used with any of the embodiments herein.

Figure 5:
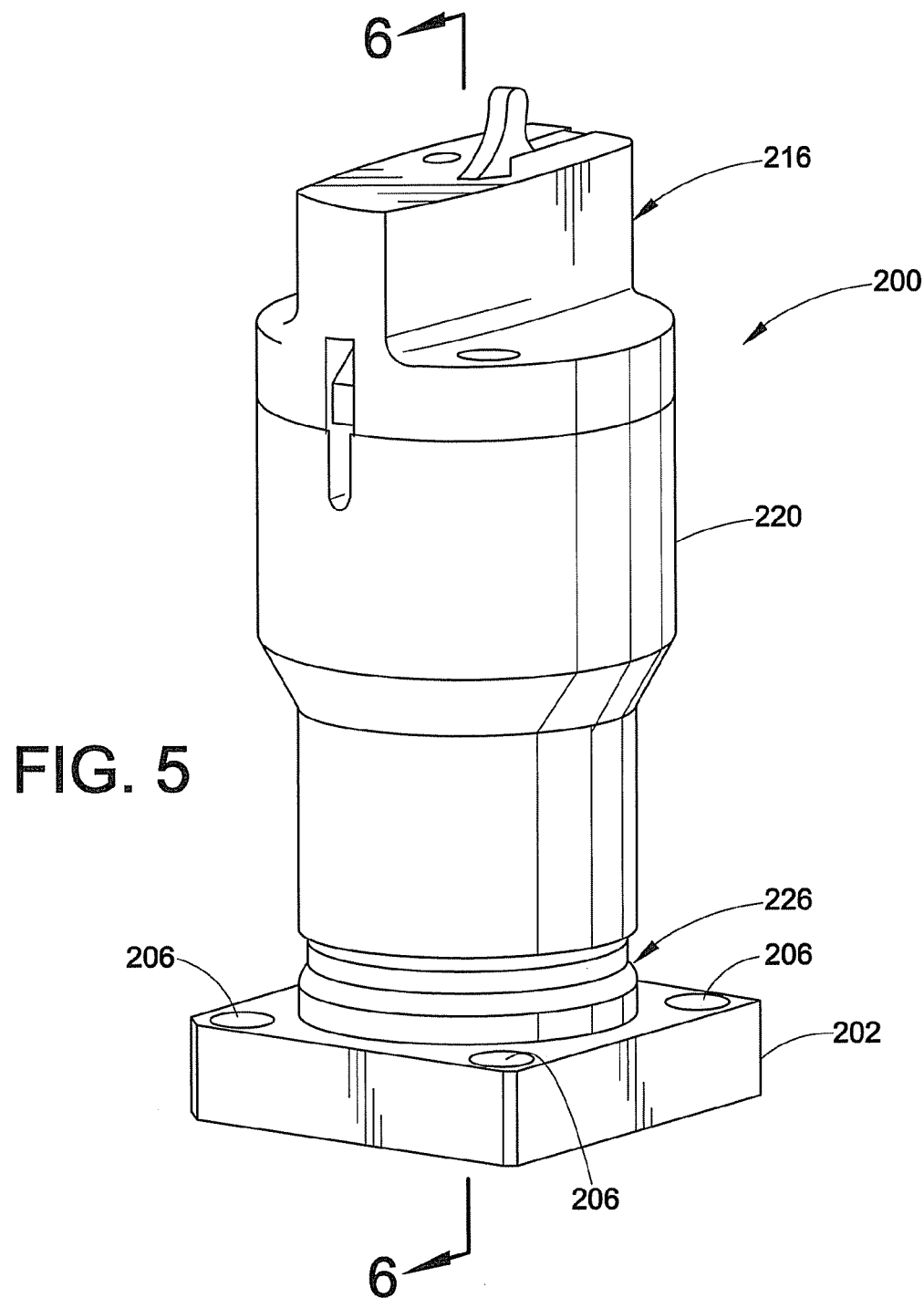
FIG. 5 is an embodiment of a diaphragm valve and manual actuator assembly in perspective.
Figure 6:
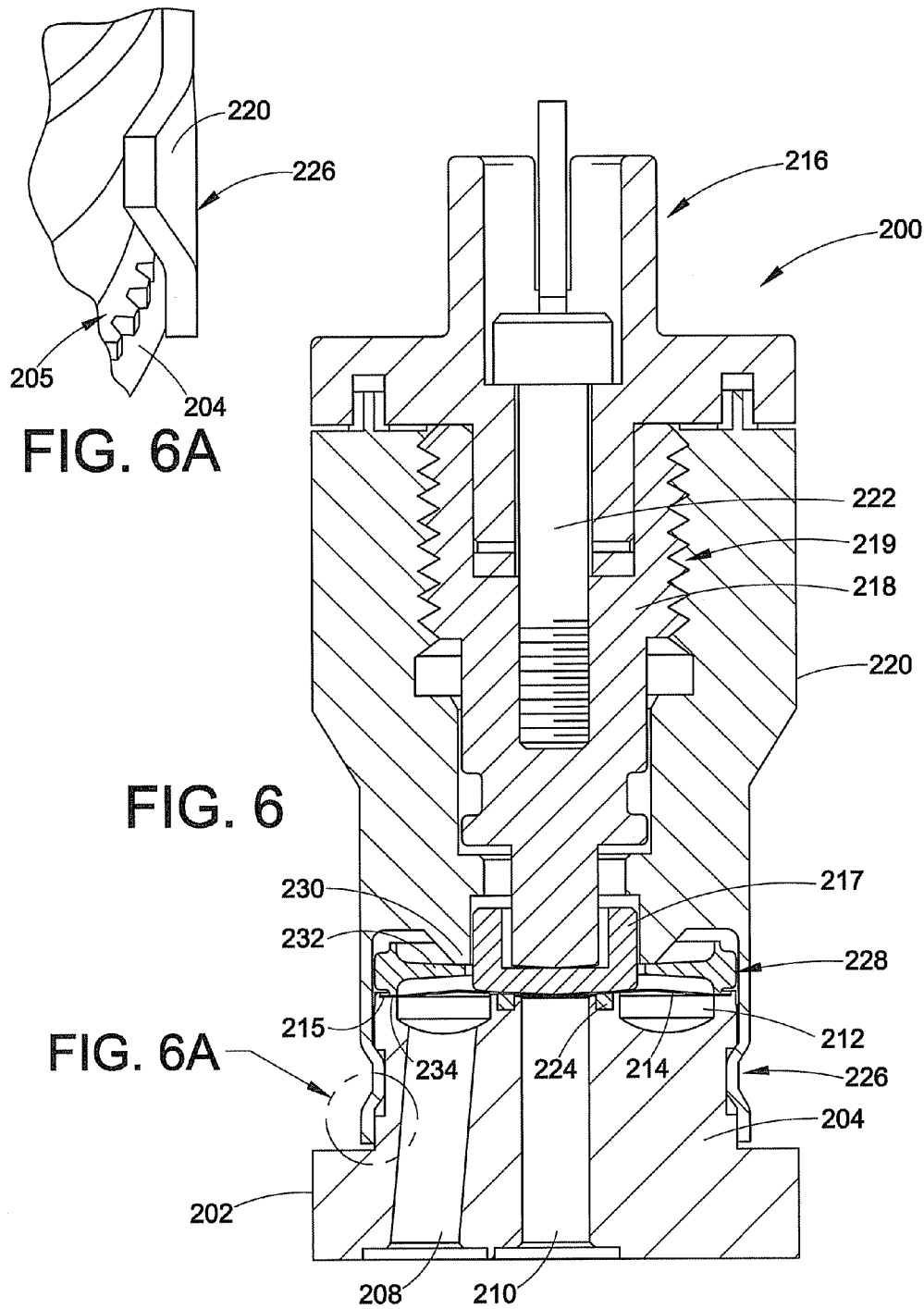
FIG. 6 is a longitudinal cross-section of the assembly of FIG. 5.

With reference to FIGS. 5 and 6 we illustrate an embodiment of a manually operated diaphragm valve assembly that incorporates one or more of the inventions herein. The manual valve assembly 200 may include a base 202 that is integral with a valve body 204. The base 202 may include mounting holes 206 as this embodiment is also for a surface mount configuration. The valve body 204 includes two flow passages 208, 210 that communicate with a valve cavity 212. A diaphragm 214 may be welded to the valve body 204 at a weld 215 in a similar configuration to the above embodiment of FIGS. 1-4.

A manually actuated handle 216 is used to rotate a threaded valve stem 218 so as to move the diaphragm 214 between valve open and closed positions. The valve stem 218 is threadably joined as at 219 to an optionally single piece housing 220, and the handle 216 is secured to the valve stem 218 by a bolt 222 so that rotation of the handle 216 causes the valve stem 218 to be axially translated up and down depending on the direction of rotation of the handle 216. The valve stem 218 may engage a button 217 that contacts the non-wetted surface of the diaphragm 214. The valve stem 218 thus moves the diaphragm 214 between its open and closed positions by moving an inner portion towards and away from the valve seat 224.

As in the above described embodiment herein, the housing 220 may be joined to the valve body 204 by a crimped portion 226. With reference to FIG. 6A we illustrate an optional feature of providing a knurled portion 205 of the valve body 204 below or adjacent to the crimped portion 226. This knurling or other suitable roughened or frictional interface between the housing 220 and the valve body 204 will reduce any tendency for torque to be transmitted between the handle 216 and the valve body 204, which torque could otherwise tend to weaken the crimped connection or also adversely change the clamping force applied to the diaphragm.

A clamp ring 228 is provided and may be used in the same manner as described in the above first embodiment. The handle 216 may be used as a cap to enclose the actuator and valve assembly 200. The housing 220 may include a load applying member 230 that engages the clamp ring 228 so as to impart a load on the inner ring 232 which is translated into compressive live load to clamp the diaphragm 214 between the clamp ring 228 and a support surface 234 on the valve body 204. The clamped portion of the diaphragm 214 preferably is spaced from and radially inward of the weld 215 and also preferably radially inward from a heat affected zone of the diaphragm 214.

The manually actuated valve 200 in this example may be a quarter turn valve, however other configuration may be used as needed including half turn and full turn to name two examples. Because the valve stem 218 is threadably joined to the housing 220 by the threaded connection 219, rotation of the valve stem 218 may have a tendency to impart unwanted torque on the housing 220 which could weaken the crimped connection between the housing 220 and the valve body 204. The clamp ring 228 counteracts this tendency because in the area of the clamped portion of the diaphragm, there is substantial friction and load between the protrusion 230 and the clamp ring 228, as well as substantial friction and load between the clamp ring 228 and the welded diaphragm 214. These frictional loads will tend to lessen and in many cases eliminate the effect if any of torque induced in the housing 220 due to manual actuation of the valve 200.

In the first two embodiments above, the clamp ring as an integral single piece body provides both the clamping function on the diaphragm as well as providing that load as a live load. However, in other embodiments, the clamping force and the live load may be accomplished with two or more separate pieces. With reference to FIG. 7 we show such an embodiment in a diaphragm valve 250 having a welded diaphragm 252 secured to the valve body 254 at a weld 256. The diaphragm 252 is compressed between a clamp ring 258 and a support surface 260 of the valve body 254. A separate live load member 262, for example, a Bellville spring or other resilient spring-like member, is captured between a support or load applying surface 264 of the housing 266 and a bearing surface 268 of the clamp ring 258. The surface 264 may alternatively be provided by a protrusion of the housing as in the first and second embodiments described herein above. The member 262 in an unstressed or unloaded condition may have a conical or other non-planar shape that becomes somewhat or completely planar or possibly inverted when the housing 266 is secured to the valve body 254, thus providing a live load against the clamp ring 258. In an alternative embodiment, the member 262 or the housing 266 or both may be configured so that the member 262 cannot be installed backward or upside down as viewed in the drawings.

In still another alternative embodiment illustrated in FIG. 8, the clamp ring 258 may also be welded to the valve body 254 as at weld 280 such that the clamp ring 258, diaphragm 252 and the valve body are joined by one or more welds. The clamp ring 258 is used to apply a clamping force to the diaphragm against a non-welded support surface of the valve body 254 radially inward of the weld site, and the live load member 262 is also used to provide the live load bias against the clamp ring 258.

Figure 9:
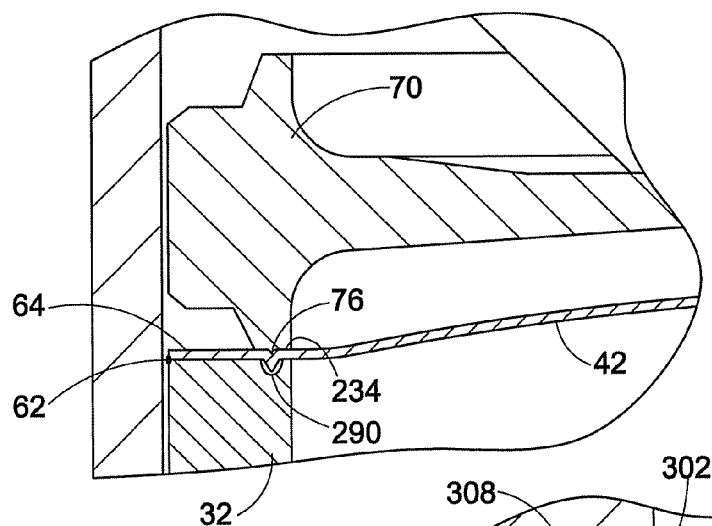
FIG. 9 illustrates an alternative compression technique for a diaphragm.

In the embodiment of FIG. 9 which is an alternative embodiment for example to the embodiment of FIG. 4 or FIG. 6, a groove or other recess 290 may be formed in the support surface 234 of the valve body 204. At least a portion of the clamped portion 76 of the diaphragm will be pressed down into this groove 290 when the clamp ring 70 is initially loaded, thereby providing a mechanical lock between the diaphragm 42 and the valve body 32 and the clamp ring 70, which in some applications may further help in isolating bending moments and stresses from affecting the weld 62 or the heat affected zone 64.

Figure 10:
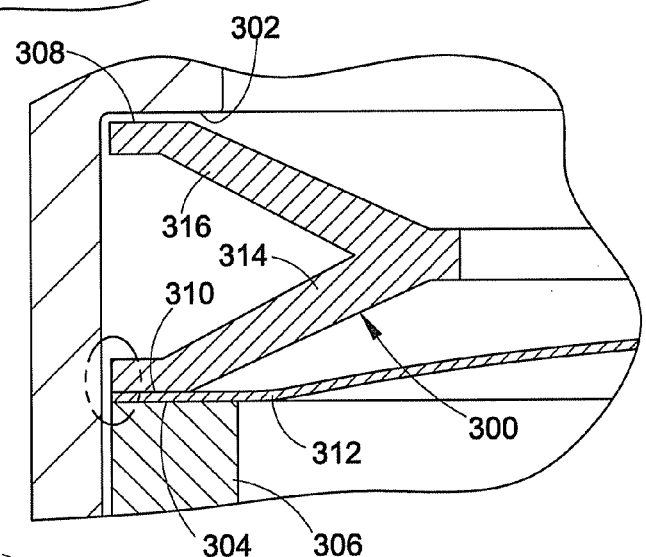
FIG. 10 illustrates another embodiment of a clamp ring.

In the embodiment of FIG. 10 we illustrate an alternative geometry for the clamp ring 300. This clamp ring 300 may be an integral body or may be realized, for example, with two Bellville type spring washers positioned back to back (convex sides facing each other). In this embodiment, the clamp ring 300 is captured between a surface 302 of the housing and a support surface 304 of the valve body 306. The clamp ring 300 includes a first load surface 308 that engages the surface 302 of the housing, and a bearing surface 310 that applies a compressive load to the diaphragm 312. The double sided clamp ring 300 thus can provide twice the live load force to the diaphragm as compared with a single sided embodiment such as FIG. 4. The protrusion of the housing (not shown) may still be used to further deflect the clamp ring as in the above embodiments. Note that the compression of the upper side 316 of the clamp ring towards the lower side 314 also provides a live load engagement.

Figure 11:
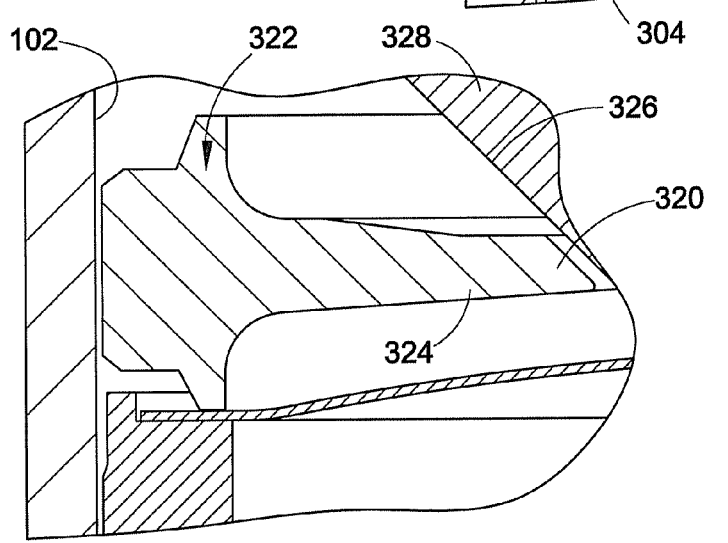
FIG. 11 illustrates another embodiment of a clamp ring centering feature.

In the embodiment of FIG. 11, the radially inner edge 320 of the clamp ring 322 may be tapered and the radius of the inner ring 324 sized so that the inner edge 320 engages a tapered surface 326 of the protrusion 328 of the actuator housing. This engagement may be used for centering the clamp ring 322 in the housing rather than having to necessarily rely on close tolerance control between the outside diameter of the clamp ring 322 and the inside diameter of the cylindrical interior wall 102 of the housing.

Figure 12:
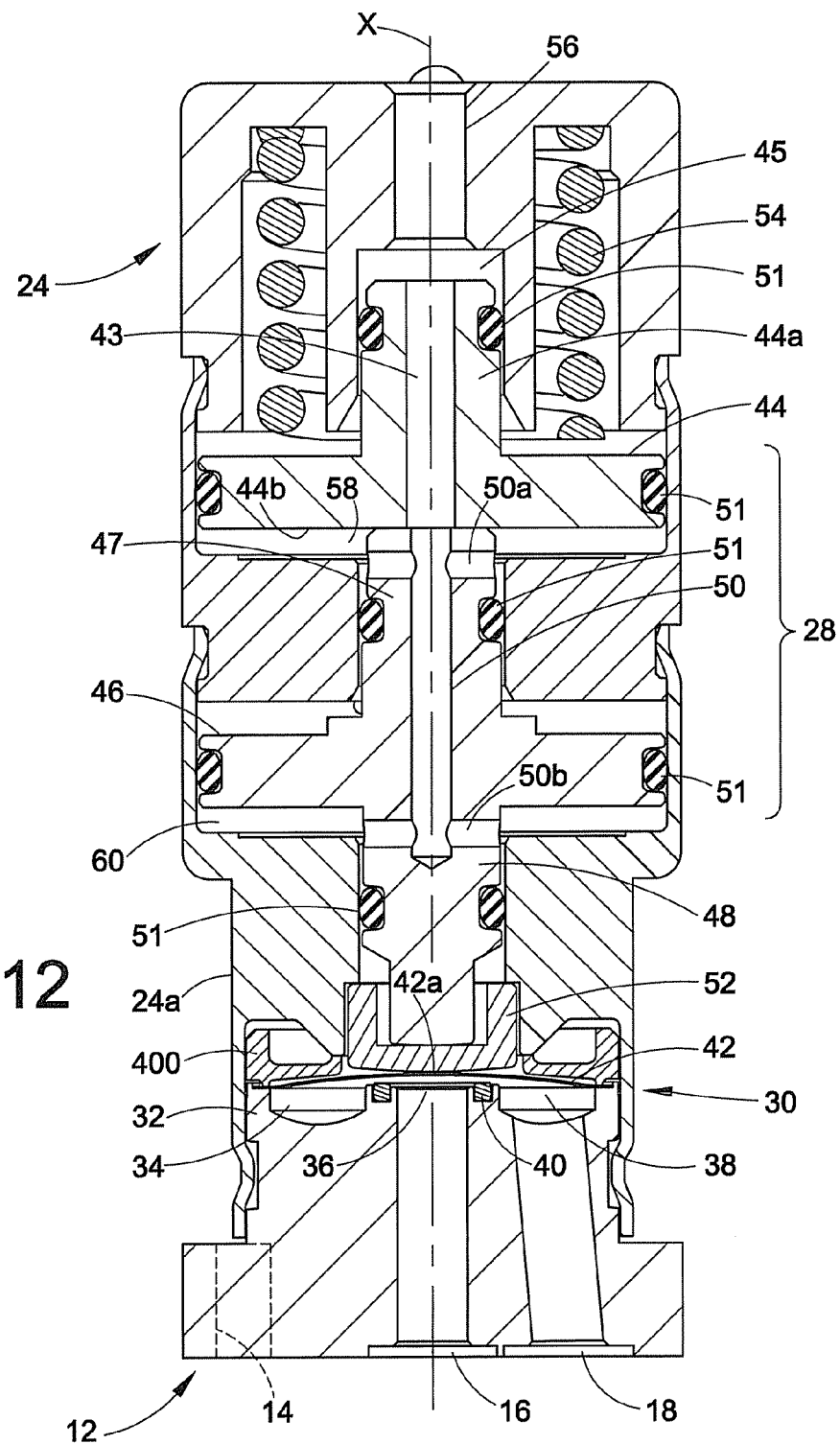
FIG. 12 illustrates another embodiment of a clamp ring used in a pneumatically actuated valve, in longitudinal cross-section.

FIG. 12 illustrates another embodiment that may be similar in many respects to the embodiment of FIGS. 1-4 herein, and like reference numerals are used for like parts and the description thereof need not be repeated. The difference in the two embodiments is the configuration and geometry of the clamp ring 400. The clamp ring 400 may also be used in the manual actuator embodiment of FIGS. 5 and 6, for example.

FIGS. 13, 13A and 13B illustrate the clamp ring 400 in greater detail. The clamp ring 400 includes an outer circumferential body 402 and a radially inwardly extending ring 404. The inner end 406 of the ring 404 presents a surface 408 against which a load applying surface 100 of the housing 24a presses when the housing 24a and valve body 32 are assembled. A rib 410 presents a bearing surface 74. The cantilevered nature of the ring 404 flexes resiliently with an elastic deformation, and thereby translates the load provided by the housing 24a into a compressive live-loaded force on the diaphragm 42, with a clamped portion 76 of the diaphragm being compressed between the bearing surface 74 and the valve body support surface 72. This clamped portion 76 helps isolate the weld site, particularly the weld 62 and a portion or all of the heat affected zone 64.

It will be noted that the embodiment of FIGS. 13A, B is not a symmetrical clamp ring about the X axis, although it may be configured as symmetrical if so required. The clamp ring 400 presents a lower support surface 412 in close proximity to the non-wetted side of the diaphragm 42 so as to support the diaphragm 42 particularly when the diaphragm is stressed upwardly under fluid pressure when the valve is open. Although asymmetrical about the radial axis Y, the clamp ring 400 may be appropriately dimensioned so that if it is installed upside down in an orientation opposite that illustrated in FIG. 12, the height profile may not permit the housing 24a from being installed on the valve body 32.

With reference to FIG. 14 and FIGS. 14A-14C, an embodiment of an optional mounting bolt retention feature is illustrated. This feature may be used, for example, to retain mounting bolts 450 that are used to attach the base 12 to an adjacent manifold, substrate or other surface. Although illustrated in terms of a surface mount manifold device, the retention feature may be used in any application where it is desired to retain a mounting bolt with a body wherein the body can accommodate the retention feature.

Figure 14:
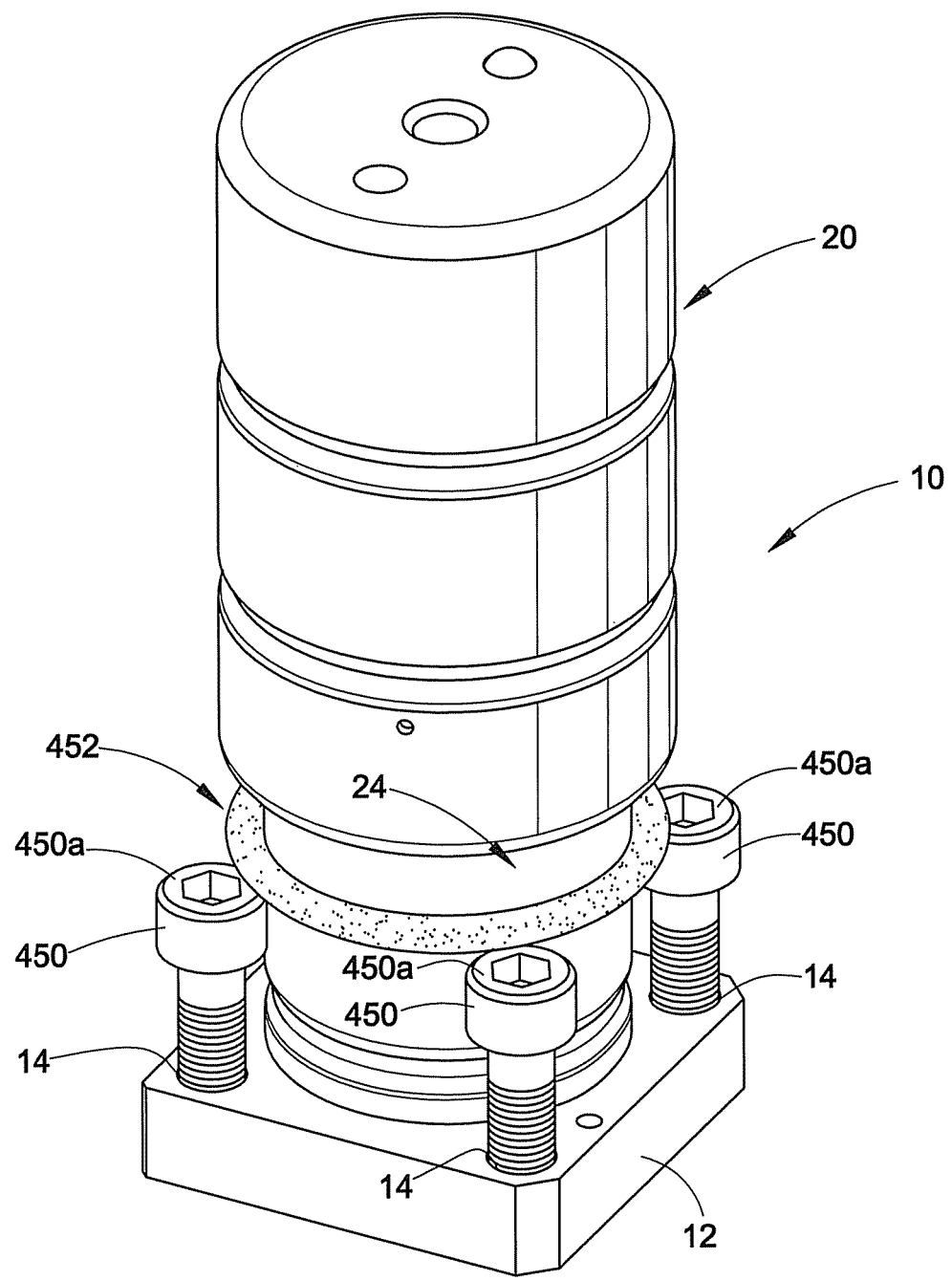
FIG. 14 illustrates a mounting bolt retention feature that may optionally be used with the assembly of the various embodiments herein or other embodiments.
Figure 14C:
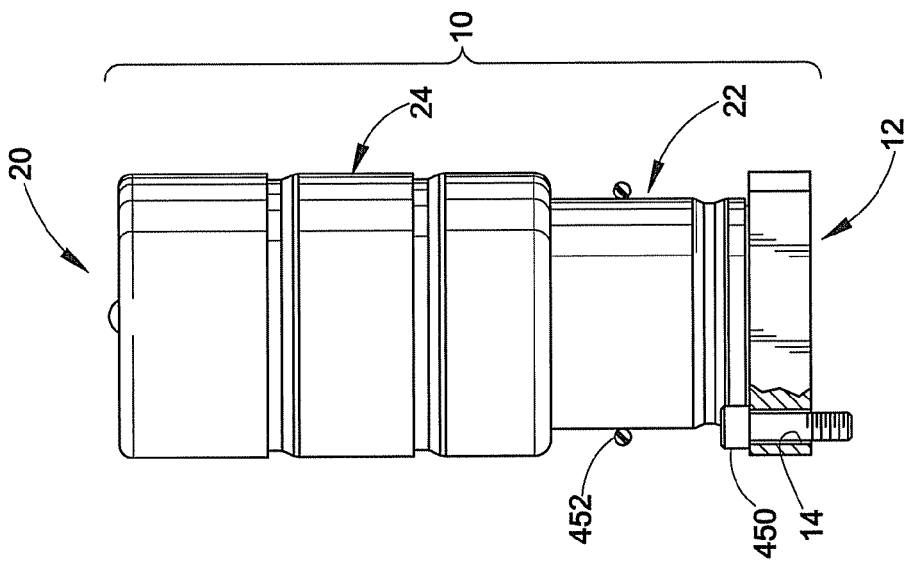
FIGS. 14A-14C illustrate an exemplary method for using the retention feature of FIG. 14.
Figure 14B:
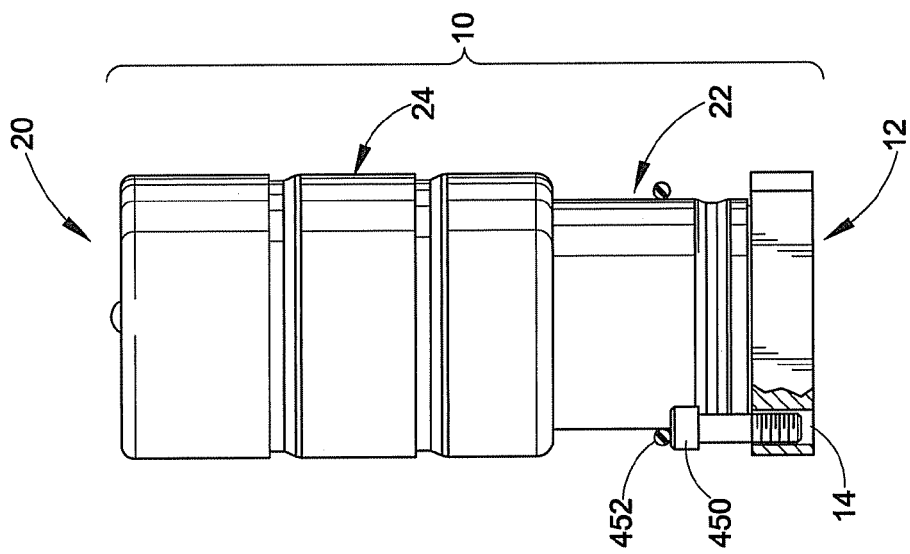
Figure 14A:
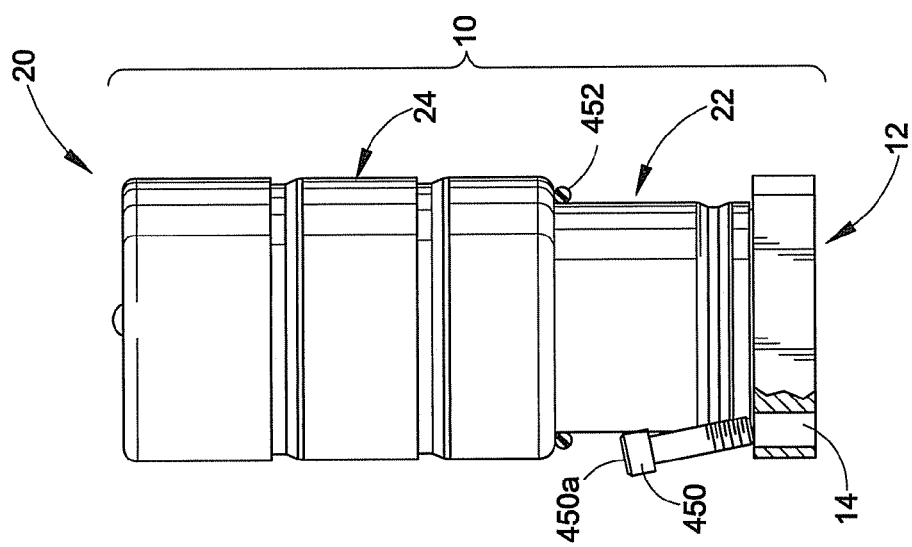

The mounting bolts 450 are received in the mounting holes 14 (FIG. 2) and are used to attach the base 12 (including the valve and actuator assembly) to a surface such as a manifold, substrate and so on. A retention feature 452, in this example being realized in the form of an annular o-ring 452, is disposed on the housing 24 and sized with a preferably snug fit. In FIG. 14 the o-ring 452 has been pushed down close enough to the base 12 so as to engage a surface 450a of the mounting bolts 450. The o-ring 452 should be selected to be of sufficient width so as to prevent the mounting bolts 450 from falling out of their respective mounting holes 14. The o-ring 452 thus prevents the mounting bolts 450 from falling out of their respective mounting holes 14 during normal handling and transportation prior to mounting the assembly 10 onto a surface. As illustrated in FIG. 14A, in order to either remove or insert one or more of the mounting bolts 450 into their respective mounting holes 14, the o-ring 452 may be rolled or slid up the housing 24 to provide sufficient clearance to allow the mounting bolts to be inserted or removed. In FIG. 14B the o-ring 452 is slid back down sufficiently to interfere with the mounting bolts 450 falling out. In FIG. 14C, once the assembly 10 has been mounted onto a surface (not shown) the o-ring 452 may be left in position or pulled up to a different position.

The inventions herein also contemplate methods associated with the, manufacture, operation and use of the clamp ring and other structural features of the diaphragm device. In one embodiment for example, a method of manufacturing a diaphragm valve may include the steps of welding an outer portion of a diaphragm to a valve body and applying a compressive load to the diaphragm against the valve body at a clamp location that is between the welded portion of the diaphragm and the center of the diaphragm. In a more specific embodiment, a live load is provided for the compressive load. In a further embodiment, a method of manufacture may include the steps of welding an outer portion of a diaphragm to a valve body and crimping a housing about the diaphragm. In a more specific embodiment, the crimped housing applies a load against a member that produces a live load compression on the diaphragm.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A diaphragm valve, comprising:
   a first body comprising a support surface and a valve seat,
   a diaphragm comprising an outer portion that is joined by a weld to said first body, a clamped portion, and an inner portion that is movable along an axis to contact said valve seat to close the diaphragm valve,
   a second body comprising an outer portion having a bearing surface and a flexible inner portion, said clamped portion of said diaphragm being compressed between said bearing surface and said support surface,
   said clamped portion of said diaphragm being disposed between said weld and said diaphragm inner portion, said second body flexible inner portion being elastically deformed to apply a load between said bearing surface and said support surface.

2. The diaphragm valve of claim 1 wherein said diaphragm comprises a generally disk shaped body having a peripheral edge, with said weld being positioned near or at said peripheral edge.

3. The diaphragm valve of claim 1 wherein said clamped portion of said diaphragm isolates said weld from bending stress when said diaphragm inner portion moves.

4. The diaphragm valve of claim 3 wherein said diaphragm inner portion is flexed between first and second positions to open and close the diaphragm valve.

5. The diaphragm valve of claim 1 wherein said second body comprises a ring-like body having a radially outer portion and a radially inner disk that extends inward from said radially outer portion of said second the body, said radially outer portion of said second body comprising the bearing surface, said radially inner disk being cantilevered from said outer portion of said second the body.

6. The diaphragm valve of claim 5 comprising a member, said member comprising a load applying surface that applies a load against said second body radially inner disk to compress said diaphragm clamped portion between said bearing surface and said support surface.

7. The diaphragm valve of claim 6 wherein friction between said first body and said member and friction between said second body and said diaphragm resist relative rotation between said first body and said member.

8. The diaphragm valve of claim 1 wherein said first body comprises a valve body and said second body comprises a clamp ring.

9. The diaphragm valve of claim 1 wherein said clamped portion of said diaphragm is spaced from said weld and a heat affected zone of said diaphragm.

10. The diaphragm valve of claim 1 wherein said clamped portion of said diaphragm is adjacent said weld and a heat affected zone of said diaphragm.

11. The diaphragm valve of claim 1 wherein said second body applies a spring load between said diaphragm and said first body support surface.

12. The diaphragm valve of claim 1 comprising a cylindrical body joinable to said first body by a crimped portion of said cylindrical body.

13. The diaphragm valve of claim 12 wherein said second body comprises a generally circular outer wall that closely fits within a cylindrical interior wall of said cylindrical body to center said second body in said cylindrical body.

14. The diaphragm valve of claim 12 wherein said cylindrical body at least partially encloses an actuator.

15. The diaphragm valve of claim 1 wherein said second body comprises a symmetrical disk that is symmetrical about a radial axis of said second body.

16. The diaphragm valve of claim 1 wherein said second body comprises an integral body that applies said load against said diaphragm clamped portion as a live load.

17. The diaphragm valve of claim 1 wherein said second body comprises two separate parts, a first part that comprises said bearing surface and a second part that produces a live load against said diaphragm clamped portion.

18. The clamp ring of claim 1 wherein said second body comprises a disk portion that comprises an elastically deformed and cantilevered ring.

19. The clamp ring of claim 18 wherein said disk portion is asymmetrical about a radial axis of said clamp ring.

20. A diaphragm valve having a longitudinal axis, comprising:
    a valve body comprising a support surface and a valve seat,
    a diaphragm comprising an outer portion that is joined by a weld to said valve body and an inner portion that is movable along the longitudinal axis into contact with said valve seat to close the diaphragm valve,
    a cylinder body joined to the valve body,
    a clamp ring comprising a bearing surface that applies a compressive load against a clamped portion of said diaphragm and said valve body support surface, said clamp ring comprising an elastically deformed portion that produces said compressive load against said clamped portion of said diaphragm,
    said clamped portion of said diaphragm being disposed between said weld and said diaphragm inner portion.

21. The diaphragm valve of claim 20 wherein said diaphragm comprises a generally round body with a center that is coaxial with a longitudinal axis of the diaphragm valve, said clamped portion of said diaphragm being radially inward from said weld and a heat affected zone of said diaphragm.

22. The diaphragm valve of claim 20 wherein said cylinder body comprises a housing for an actuator for the diaphragm valve.

23. The diaphragm valve of claim 20 wherein said cylinder body comprises a load applying surface that applies a load against said clamp ring to produce said compressive load between said diaphragm clamped portion and said support surface of said valve body, said load applying surface applying load against said clamp ring at a location that is radially inward of said clamped portion of said diaphragm.

24. The diaphragm valve of claim 22 wherein said cylinder body is joined to said valve body by a crimped portion of said cylinder body.

* * * * *